US012113422B2

(12) United States Patent
Zuo et al.

(10) Patent No.: US 12,113,422 B2
(45) Date of Patent: *Oct. 8, 2024

(54) ROTATING MOTOR AND FAN (71) Applicant: GUANGDONG WELLING MOTOR MANUFACTURING CO., LTD., Guangdong (CN)

(72) Inventors: Yajun Zuo, Guangdong (CN); Yueqiang Yu, Guangdong (CN); Chuang Chi, Guangdong (CN); Hongxiao Wang, Guangdong (CN)

(73) Assignee: GUANGDONG WELLING MOTOR MANUFACTURING CO., LTD., Guangdong (CN)

( * ) Notice: Subject to any disclaimer, the term of this patent is extended or adjusted under 35 U.S.C. 154(b) by 274 days.

This patent is subject to a terminal disclaimer.

(21) Appl. No.: 17/825,478

(22) Filed: May 26, 2022

(65) Prior Publication Data
US 2022/0286013 A1  Sep. 8, 2022

Related U.S. Application Data

(63) Continuation of application No. PCT/CN2020/135849, filed on Dec. 11, 2020.

(30) Foreign Application Priority Data

May 15, 2020 (CN) .......................... 202010411908.7

(51) Int. Cl.
*H02K 5/16* (2006.01)
*H02K 1/18* (2006.01)
(Continued)

(52) U.S. Cl.
CPC ............. *H02K 5/1732* (2013.01); *H02K 1/18* (2013.01); *H02K 5/161* (2013.01); *H02K 7/083* (2013.01);
(Continued)

(58) Field of Classification Search
CPC .......... H02K 7/083; H02K 7/14; H02K 5/161; H02K 5/1732; H02K 1/146; H02K 1/185;
(Continued)

(56) References Cited

U.S. PATENT DOCUMENTS

2004/0160138 A1  8/2004 Kuroda et al.
2008/0304986 A1  12/2008 Kenyon et al.
(Continued)

FOREIGN PATENT DOCUMENTS

CN    107171460 A    9/2017
CN    109104010 A    12/2018
(Continued)

OTHER PUBLICATIONS

International Search Report dated Feb. 26, 2021 issued in PCT/CN2020/135849.
(Continued)

*Primary Examiner* — Alexander A Singh
(74) *Attorney, Agent, or Firm* — SCULLY, SCOTT, MURPHY & PRESSER, P.C.

(57) ABSTRACT

A rotating motor and a fan are provided. In the rotating motor, by arranging a first bearing seat, a second bearing seat, and a plurality of support rods to form the supporting frame, the coaxiality between the first bearing seat and the second bearing seat can be ensured to reduce the accumulated tolerance of assembly. In addition, the motor has a stator having stator teeth. The inner diameter of the inner circular hole of the stator teeth is disposed to be larger than the outer diameter of the second bearing seat.

20 Claims, 9 Drawing Sheets

(51) Int. Cl.
  *H02K 5/173* (2006.01)
  *H02K 7/08* (2006.01)
  *H02K 7/14* (2006.01)
  *H02K 15/02* (2006.01)
  *H02K 15/14* (2006.01)

(52) U.S. Cl.
  CPC .............. *H02K 7/14* (2013.01); *H02K 15/02* (2013.01); *H02K 15/14* (2013.01); *H02K 2213/03* (2013.01)

(58) Field of Classification Search
  CPC .......... H02K 1/18; H02K 15/14; H02K 15/02; H02K 2213/03
  USPC ...................................................... 310/89, 90
  See application file for complete search history.

(56) References Cited

U.S. PATENT DOCUMENTS

| | | | |
|---|---|---|---|
| 2017/0256995 | A1 | 9/2017 | Lam et al. |
| 2018/0076683 | A1* | 3/2018 | Hwang ................. H02K 5/207 |
| 2018/0363669 | A1 | 12/2018 | Sullivan |
| 2018/0366999 | A1* | 12/2018 | Clothier ................. H02K 7/083 |
| 2020/0392989 | A1* | 12/2020 | Kim ....................... H02K 5/161 |

FOREIGN PATENT DOCUMENTS

| | | |
|---|---|---|
| CN | 109104038 A | 12/2018 |
| CN | 208849562 U | 5/2019 |
| CN | 110454415 A | 11/2019 |
| CN | 109185196 B | 4/2020 |
| CN | 211930355 U | 11/2020 |
| CN | 211930393 U | 11/2020 |
| GB | 2563617 B | 4/2020 |
| GB | 2563613 B | 10/2021 |
| JP | H1144341 A | 2/1999 |
| JP | H11234955 A | 8/1999 |
| JP | 2002535059 A | 10/2002 |
| JP | 2004254371 A | 9/2004 |
| JP | 2007135342 A | 5/2007 |
| JP | 2008303876 A | 12/2008 |
| JP | 2179239 A | 7/2009 |
| JP | 2013188091 A | 9/2013 |
| JP | 2017123771 A | 7/2017 |
| JP | 2017189093 A | 10/2017 |
| JP | 2019009983 A | 1/2019 |
| JP | 2019009984 A | 1/2019 |
| JP | 2019009986 A | 1/2019 |
| JP | 2019033559 A | 2/2019 |
| KR | 20170104402 A | 9/2017 |
| WO | 2008051534 A2 | 5/2008 |
| WO | 2019166777 A1 | 9/2019 |

OTHER PUBLICATIONS

Notification of the Second Office Action dated Aug. 26, 2022 received in Chinese Patent Application No. CN 202010411908.7.
Decision to Grant a Patent dated Jul. 25, 2023 received in Japanese Patent Application No. JP 2022-528286.
Notice of Reasons for Refusal dated May 30, 2023 received in Japanese Patent Application No. JP 2022-528286.
International Search Report dated Feb. 26, 2021 received in International Application No. PCT/CN2020/135849.
Second Office Action dated Aug. 26, 2022 received in Chinese Patent Application No. CN 202010411908.7.
Extended European Search Report dated May 22, 2023 received in European Patent Application No. EP 20935394.5.
Notification of Decision of Rejection dated Nov. 8, 2022 received in Chinese Patent Application No. CN 202010411908.7.
First Office Action dated May 9, 2022 received in Chinese Patent Application No. CN 202010411908.7.
Notice of Re-Examination dated Nov. 2, 2023 received in Chinese Patent Application No. CN 202010411908.7.
Decision of Re-Examination dated Jan. 3, 2024 received in Chinese Patent Application No. CN 202010411908.7.
Notice of Submission of Opinion dated Mar. 29, 204 received in Korean Patent Application No. KR 10-2022-7016883.

* cited by examiner

ROTATING MOTOR AND FAN

CROSS REFERENCE TO RELATED APPLICATIONS

The present application is a continuation application of PCT International Application No. PCT/CN2020/135849, filed on Dec. 11, 2020, which claims priority to and benefits of Chinese Patent Application No. 202010411908.7, filed on May 15, 2020. The entire contents of all the aforementioned applications, including any intervening amendments thereto, are incorporated herein by reference for all purposes. No new matter has been introduced.

FIELD

The present application relates to the field of motor, and more particularly, to a rotating motor and a fan.

BACKGROUND

The descriptions herein merely provide background information related to the present application and do not necessarily constitute prior art.

With the increasing demand for the rotating speed of rotating motors, for example, the rotating speed is required to be in the range of tens of thousands to hundreds of thousands of revolutions, or even several hundreds of thousands of revolutions per minute, the corresponding requirements for the manufacturing accuracy of the rotating motors are also getting higher and higher. Thus, high accuracy of the coaxiality of the rotor and stator of the rotating motor, the coaxiality of the bearing and the rotating shaft, the coaxiality between the two bearing seats corresponding to the bearings at both ends of the rotating shaft, and the coaxiality of the stator, rotor and bearing seats and other components must be guaranteed to reach a high accuracy to meet the high speed requirements of the rotating motors. At the same time, in order to improve the efficiency of the rotating motors, the air gap between the stator and the rotor is reduced, which further improves the assembly accuracy requirements between the various components.

For most of the current rotating motors, the rotating motors are provided with a plurality of components, such as the stator, the stator support structure, the components in the rotor, and the supporting structure of the rotor, which each generally includes multiple components. However, there is a certain allowable tolerance in the assembly of any two adjacent components, and the accumulated tolerance of multiple components assembly will be higher, resulting in a decrease in the working performance and reliability of the rotating motor.

SUMMARY

One of the objects of embodiments of the present application is to at least provide a rotating motor, which aims to solve at least the problems that the accumulated tolerance of multiple components assembly is higher, which results in a decrease in the working performance and reliability of the rotating motor in prior art.

In order to solve above technical problem, the technical solution adopted in embodiments of the present application includes the following aspects.

According to a first aspect of the disclosure, a rotating motor is provided, which includes a stator, a rotor, and a supporting frame; wherein the rotor comprises a rotating shaft, a permanent magnet mounted on the rotating shaft, and a first bearing and a second bearing respectively mounted on two ends of the rotating shaft; the stator comprises a stator yoke sleeved on the supporting frame, a plurality of stator teeth arranged on the stator yoke, and coils respectively wound on the stator teeth; the supporting frame comprises a first bearing seat, a second bearing seat, and a plurality of support rods supporting the stator yoke, two ends of each support rod are respectively connected to the first bearing seat and the second bearing seat, and an interval space is provided between two adjacent support rods and configured to place the stator teeth, the first bearing is mounted in the first bearing seat, the second bearing is mounted in the second bearing seat, and inner diameter of an inner circular hole of the stator teeth is larger than an outer diameter of the second bearing seat.

According to a second aspect of the disclosure, a fan is provided, which includes the rotating motor according to the first aspect and an impeller, and the impeller is mounted on the rotating shaft.

The beneficial effect of the rotating motor provided by the embodiments of the present application is that: by arranging the first bearing seat, the second bearing seat, and a plurality of support rods connecting the first bearing seat and the second bearing seat to form the supporting frame, the coaxiality between the first bearing seat and the second bearing seat can be well guaranteed, therefore, when assembling the rotor and the supporting frame, the coaxiality between the first bearing and the second bearing can well guaranteed to reduce the accumulated tolerance of assembly; by arranging the inner diameter of the inner circular hole of the stator teeth being larger than the outer diameter of the second bearing seat, therefore, the stator can be sleeved on the supporting frame from one end of the second bearing seat, which is convenient for mounting; in addition, the rotor can be assembled with the supporting frame first, and subsequently the stator can be mounted, which is convenient to adjust the dynamic balance of the rotor and reduce undesirable problems, such as vibration and noise. The support rods of the supporting frame are configured to support the stator yoke, which can ensure the assembly accuracy of the stator and the electromagnetic air gap between the stator and the rotor, so as to ensure the working performance and reliability of the rotating motor.

The beneficial effect of the fan provided by the embodiments of the present application is that the fan uses the rotating motor of any of the above-mentioned embodiments, which can ensure the performance and reliability of the rotating motor, thereby ensuring that the fan operates smoothly and well.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

In the drawings, the reference signs are listed as follows:
100—fan;
10—rotating motor;
20—rotor; 21—rotating shaft; 211—output end; 212—induction end; 22—permanent magnet; 23—first bearing; 24—second bearing; 25—gimbal ring; 26—induction magnetic ring;
30—stator; 31—stator yoke; 311—positioning protrusion; 312—positioning groove; 32—stator tooth; 33—coil;
40—supporting frame; 41—first bearing seat; 411—accommodating groove; 42—second bearing seat; 43—support rod; 431—slot; 44—interval space;
50—soft washer; 51—soft arc-shaped petal; 52—rib;
61—impeller.

DETAILED DESCRIPTION OF EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

In the present application, unless there is additional explicit stipulation and limitation, terms such as "mount", "connect with each other", "connect", "fix", and so on should be broadly interpreted, for example, "connect" can be interpreted as being fixedly connected, detachably connected, or connected integrally; "connect" can also be interpreted as being mechanically connected or electrically connected; "connect" can be further interpreted as being directly connected or indirectly connected through intermediary, or being internal communication between two components or an interaction relationship between the two components. For the one of ordinary skill in the art, the specific meanings of the aforementioned terms in the present application can be interpreted according to specific conditions.

In the description of the present application, the describing of "one embodiment," "some embodiments," or "an embodiment" means that a particular feature, structure, or characteristic described in connection with the embodiment is included in one or more embodiments of the present application. Thus, the phrases "in one embodiment," "in some embodiments," "in other embodiments," "in further other embodiments," etc. in various places in the description are not necessarily all refer to the same embodiment, but mean "one or more but not all embodiments" unless specifically emphasized otherwise. Furthermore, the particular features, structures or characteristics can be combined in any suitable manner in one or more embodiments.

Figure 1:
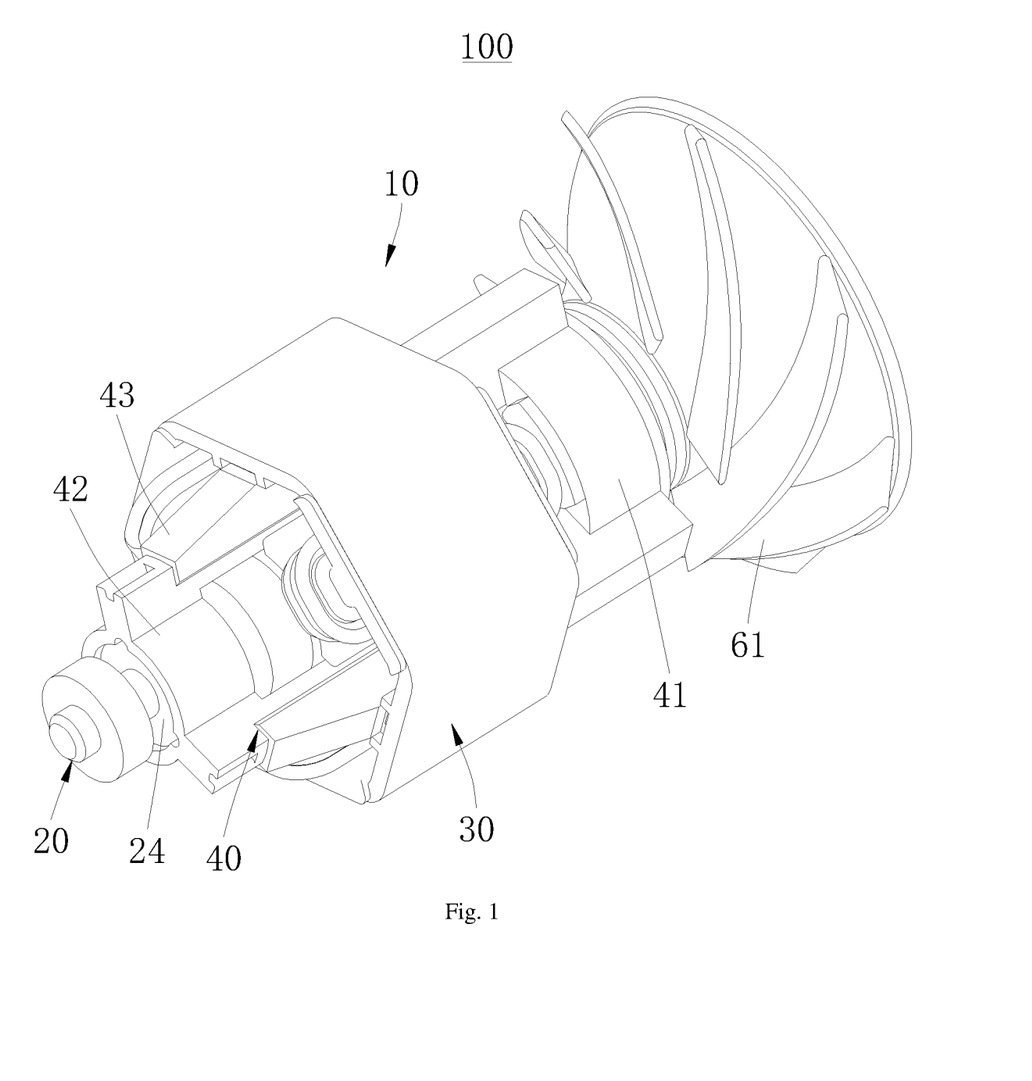
FIG. 1 is a schematic structural view of a fan provided by an embodiment of the present application.
Figure 2:
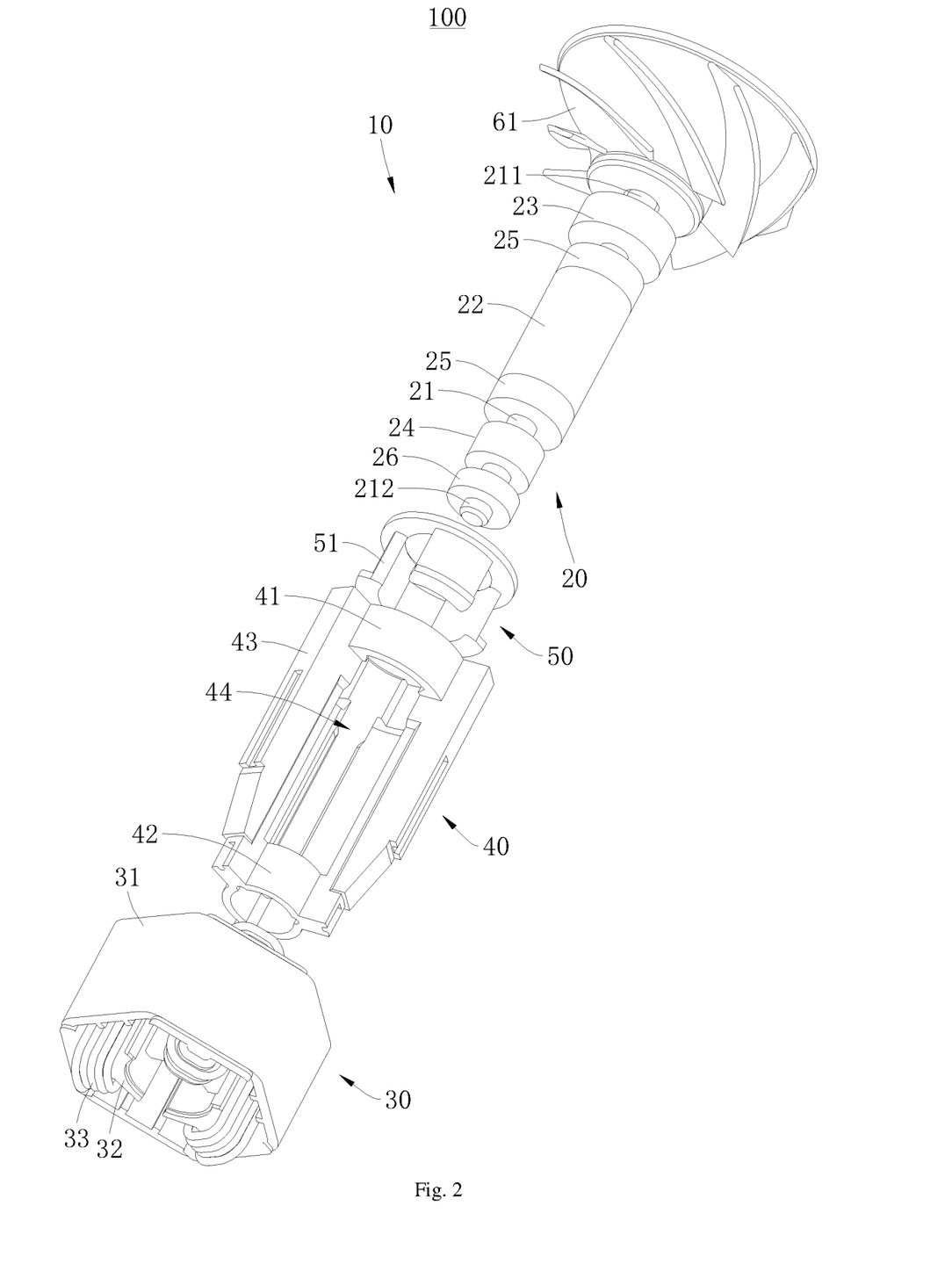
FIG. 2 is the explosion structure schematic view of the fan shown in FIG. 1.

Referring to FIG. 1 and FIG. 2, the fan 100 and the rotating motor 10 provided by the present application will now be described. The fan 100 includes a rotating motor 10 and an impeller 61.

Referring to FIG. 2, the rotating motor 10 includes a stator 30, a rotor 20, and a supporting frame 40.

Figure 6:
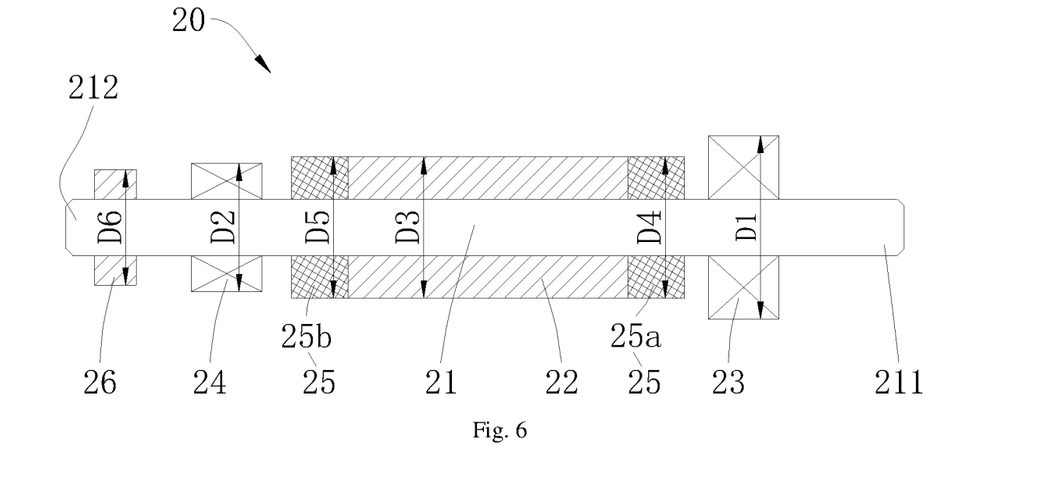
FIG. 6 is a schematic cross-sectional structural view of a rotor provided by an embodiment of the present application.

Referring to FIG. 2 and FIG. 6, the rotor 20 includes a rotating shaft 21, a permanent magnet 22, a first bearing 23, and a second bearing 24. The permanent magnet 22 is mounted on the rotating shaft 21 so that the stator 30 drives the rotating shaft 21 to rotate. The first bearing 23 and the second bearing 24 are respectively mounted at two ends of the rotating shaft 21, and the first bearing 23 and the second bearing 24 are respectively located at two ends of the permanent magnet 22; to stably support the rotating shaft 21 and ensure that the rotating shaft 21 is flexible rotating.

Figure 3:
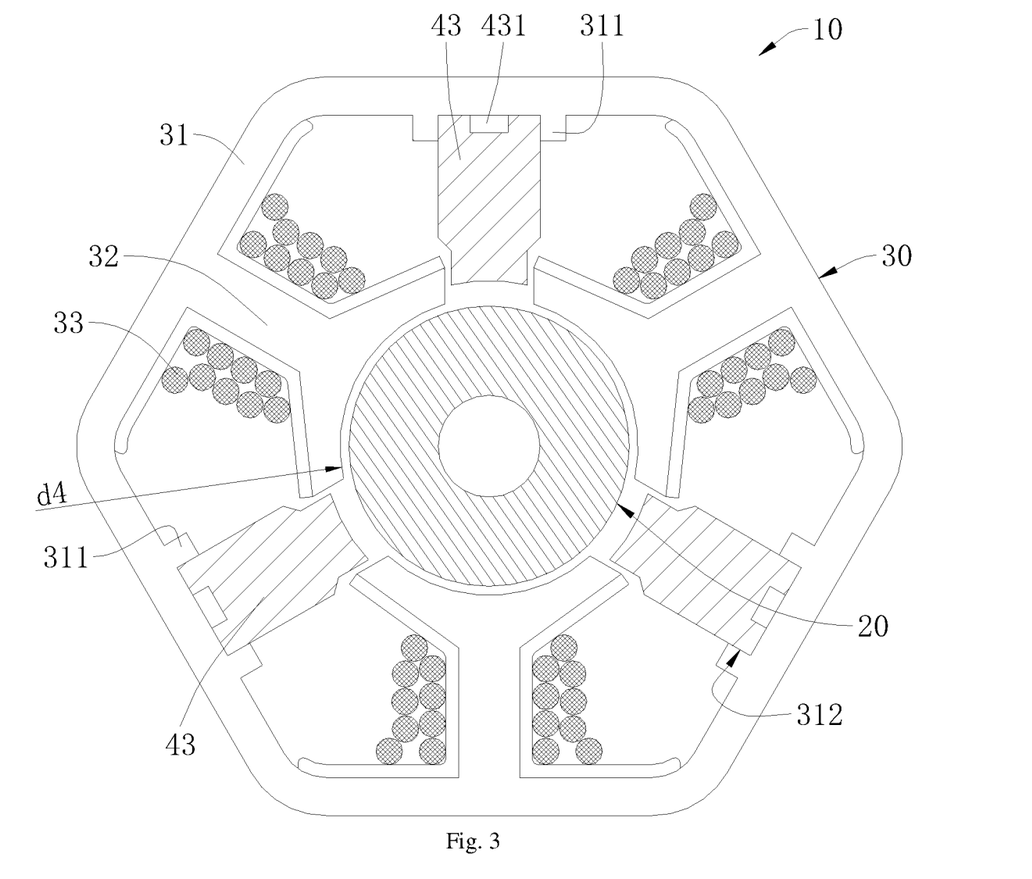
FIG. 3 is a schematic cross-sectional structural view of a rotating motor perpendicular to its axial direction provided by an embodiment of the present application.
Figure 4:
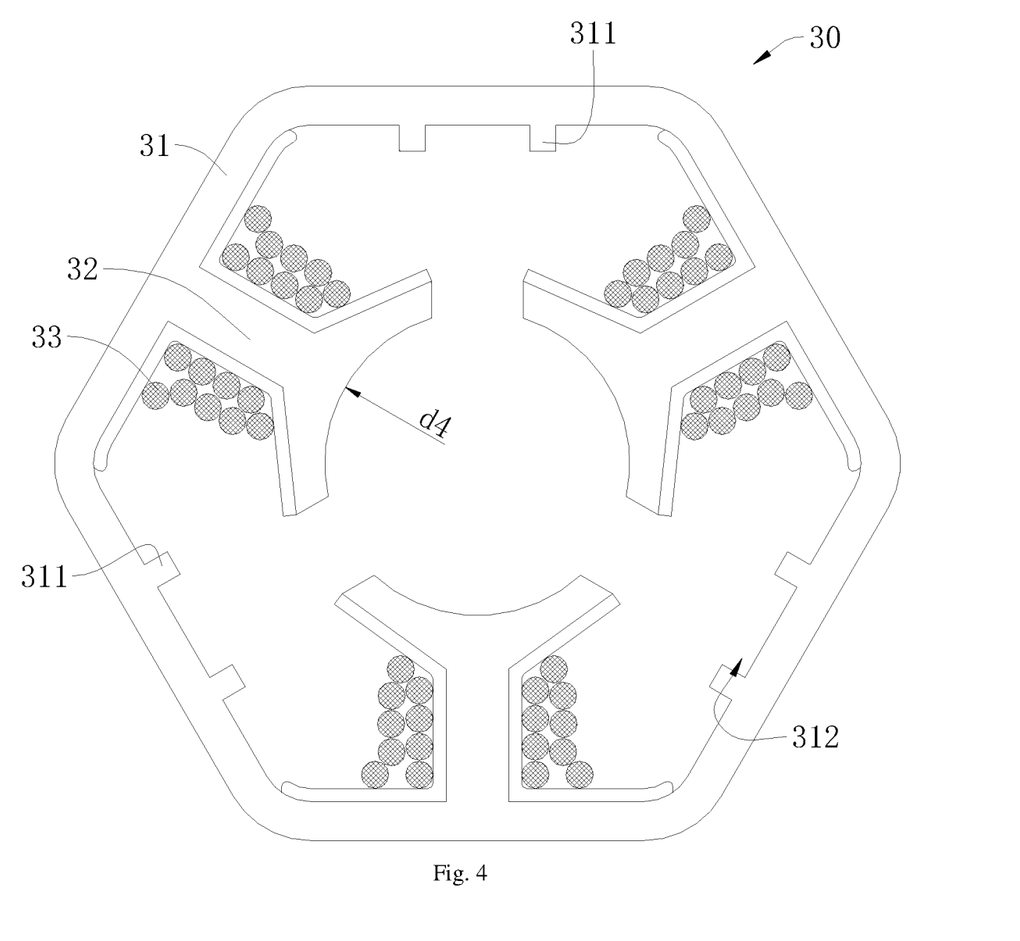
FIG. 4 is a schematic cross-sectional structural view of a stator provided by an embodiment of the present application.

Referring to FIG. 3 and FIG. 4, the stator 30 includes a stator yoke 31, a plurality of stator teeth 32, and coils 33 respectively wound on each stator tooth 32; each stator tooth 32 is arranged on the stator yoke 31, and the stator yoke 31 is mounted on the supporting frame 40, the stator yoke 31 is arranged around the supporting frame 40, so as to support the stator yoke 31 by the supporting frame 40, which is convenient for supporting and fixing the stator 30, and positioning each stator tooth 32 to ensure the coaxiality of the stator teeth 32 to better ensure the performance of the rotating motor 10.

Figure 7:
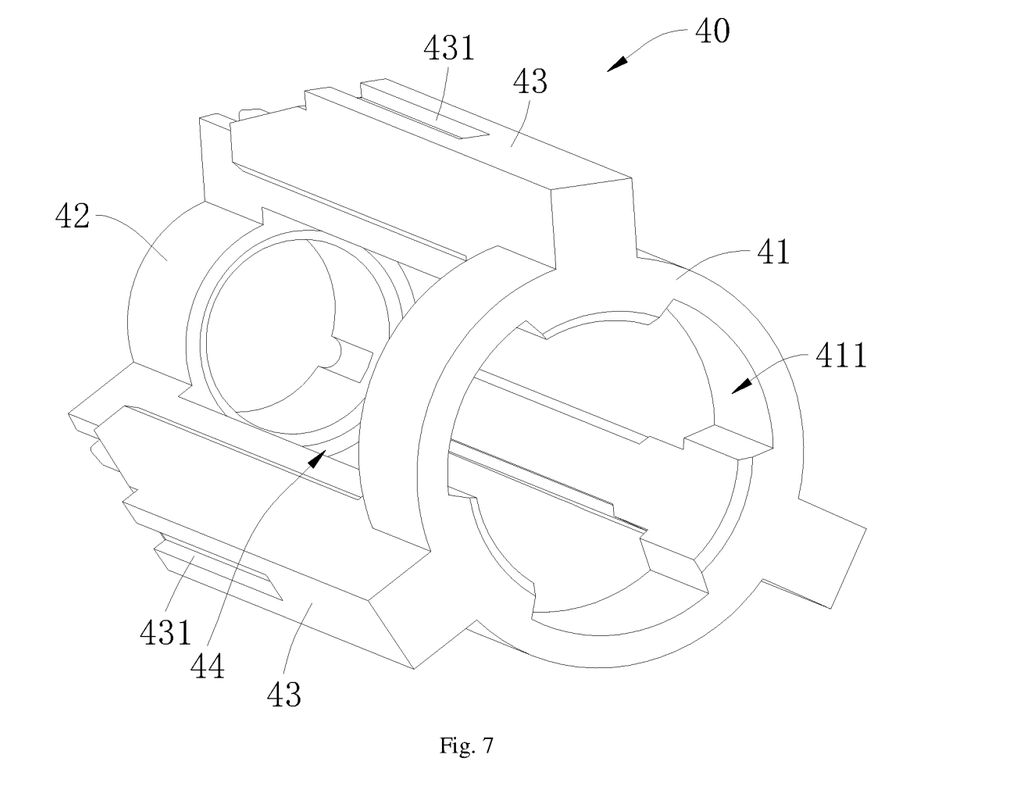
FIG. 7 is a schematic structural view of a supporting frame provided by an embodiment of the present application.

Referring to FIG. 2 and FIG. 7, the supporting frame 40 includes a first bearing seat 41, a second bearing seat 42 and a plurality of support rods 43, and two ends of each support rod 43 are respectively connected to the first bearing seat 41 and the second bearing seat 42. In other words, the supporting frame 40 includes a plurality of support rods 43, the first bearing seat 41 and the second bearing seat 42. The first bearing seat 41 is connected to one end of each support rod 43, and the second bearing seat 42 is connected to the other side of each support rod 43, and two adjacent support rods 43 are arranged at intervals. The support rods 43 are used to support the stator yoke 31, and two adjacent support rods 43 are arranged at intervals so that an interval space 44 is formed between the two adjacent support rods 43, and the stator teeth 32 can be placed between two adjacent support rods 43. The plurality of support rods 43 are connected to the first bearing seat 41 and the second bearing seat 42, which can ensure good coaxiality between the first bearing seat 41 and the second bearing seat 42.

Figure 5:
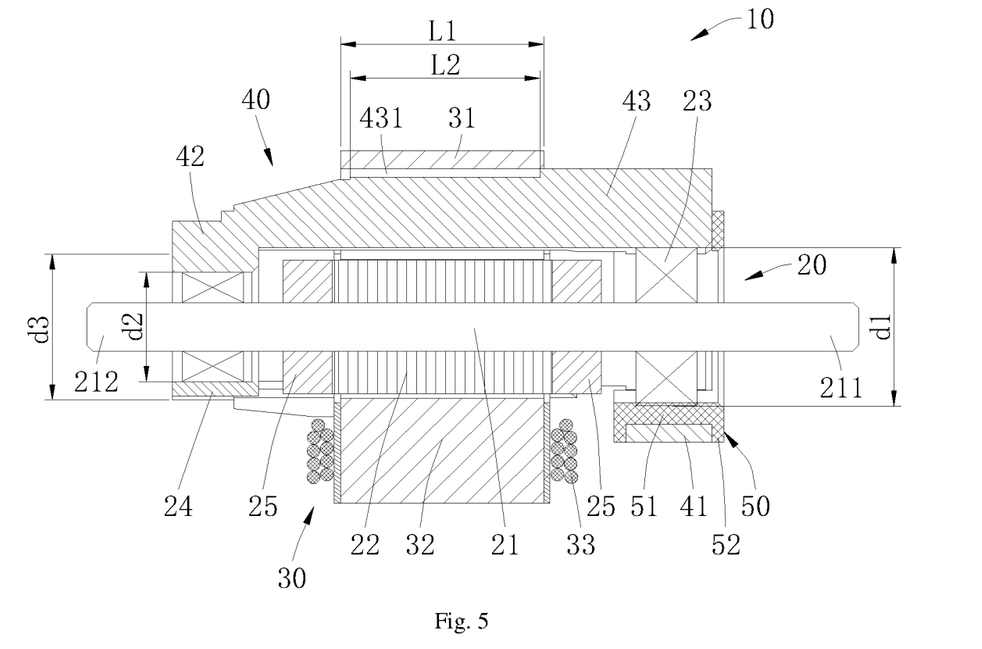
FIG. 5 is a schematic cross-sectional structural view of a rotating motor along its axial direction provided by the embodiment of the present application.

Referring to FIG. 2 and FIG. 5, when assembling the rotor 20 and the supporting frame 40, the first bearing 23 can be mounted in the first bearing seat 41, and the second bearing 24 can be mounted in the second bearing seat 42, so that the rotor 20 can be mounted in the supporting frame 40.

Referring to FIG. 3, FIG. 4 and FIG. 5, the inner circular hole of the stator teeth 32 refers to the inner circular hole surrounded by a plurality of stator teeth 32 in the stator 30; the inner diameter d4 of the inner circular hole of the stator teeth 32 is larger than that of the second bearing seat 42. Therefore, when the stator 30 is mounted, the stator 30 can be sleeved on the supporting frame 40 from one end of the second bearing seat 42 to facilitate the positioning and fixing of the supporting frame 40 and the stator 30, and when manufacturing the stator 30, the stator teeth 32 of the stator 30 can be positioned to ensure the coaxiality of the plurality of stator teeth 32, thereby facilitating the rotation of the rotor 20. In addition, when the rotating motor 10 is assembled, the rotor 20 and the supporting frame 40 can be assembled first, so that the overall structure formed by the rotor 20 and the supporting frame 40 can be dynamically balanced and calibrated, and the rotating shaft 21, the first bearing 23, the second bearings 24, the first bearing seat 41 and the second bearing seat 42 have good coaxiality, thereby reducing the accumulated tolerance of assembly. Thus, the stator 30 and the stator yoke 31 can be positioned by the support rod 43 during mounting, and then the stator teeth 32 can be positioned, so as to ensure the assembly accuracy of the stator 30 and the electromagnetic air gap between the stator 30 and the rotor 20.

In the embodiment, the impeller 61 is mounted on the rotating shaft 21, so that the rotating motor 10 forms the structure of the fan 100. In some other embodiments, the rotating motor 10 can also be used in other devices that need to use the rotating motor 10, that is, other loads, such as grinding wheels, can also be connected to the rotating shaft 21 to form an electric grinding wheel; the rotating motor can also be applied in shaver.

In the rotating motor 10 provided in the embodiment of the present application, by arranging the first bearing seat 41, the second bearing seat 42, and a plurality of support rods 43 connecting the first bearing seat 41 and the second bearing seat 42 to form the supporting frame 40, the coaxiality between the first bearing seat 41 and the second bearing seat 42 can be readily guaranteed. Therefore, when assembling the rotor 20 and the supporting frame 40, the coaxiality between the first bearing 23 and the second bearing 24 can be readily guaranteed to reduce the accumulated tolerance of assembly. By arranging the inner diameter d4 of the inner circular hole of the stator teeth 32 being larger than the outer diameter d3 of the second bearing seat 42, the stator 30 can be sleeved on the supporting frame 40 from one end of the second bearing seat 42, which is convenient for mounting. In addition, the rotor 20 can be assembled with the supporting frame 40 first, and subsequently the stator 30 can be mounted, which is convenient to adjust the dynamic balance of the rotor 20 and reduce undesirable problems such as vibration and noise. The support rods 43 of the supporting frame 40 are configured to support the stator yoke 31, which can ensure the assembly accuracy of the stator 30 and the electromagnetic air gap between the stator 30 and the rotor 20, so as to ensure the working performance and reliability of the rotating motor 10.

The fan 100 provided by the embodiment of the present application uses the above-mentioned rotating motor 10, which can ensure the performance and reliability of the rotating motor 10, and thus ensure the smooth and good operation of the fan 100.

In one embodiment, referring to FIG. 5 and FIG. 6, the first bearing 23 is mounted in the first bearing seat 41 with clearance fit, so as to facilitate the cooperation between the first bearing 23 and the first bearing seat 41 and to facilitate the assembly of the first bearing 23 being mounted in the first bearing seat 41. Thus, the coaxiality of the first bearing 23 and the first bearing seat 41 can be readily ensured, and at the same time, the dynamic balance of the rotor 20 can be readily calibrated.

In one embodiment, the outer diameter D1 of the first bearing 23 can be arranged to be equal to the inner diameter d1 of the first bearing seat 41, and a certain clearance fit tolerance is allowed, so that the first bearing 23 can be mounted in the first bearing seat 41 with a good clearance fit.

In one embodiment, the first bearing 23 is bonded and fixed in the first bearing seat 41 to ensure that the outer ring of the first bearing 23 is fixed to the first bearing seat 41.

In one embodiment, the first bearing 23 can be fixed on the rotating shaft 21 by bonding or interference fit, so as to ensure a good connection between the first bearing 23 and the rotating shaft 21.

In one embodiment, referring to FIG. 5 and FIG. 6, the second bearing 24 is mounted in the second bearing seat 42 with clearance fit, so as to facilitate the cooperation of the second bearing 24 and the second bearing seat 42 and to facilitate the second bearing 24 being mounted in the second bearing seat 42. Thus, the coaxiality of the second bearing 24 and the second bearing seat 42 can be readily ensured, and at the same time, the dynamic balance of the rotor 20 can be readily calibrated.

In one embodiment, the outer diameter D2 of the second bearing 24 can be arranged to be equal to the inner diameter d2 of the second bearing seat 42, and a certain clearance fit tolerance is allowed, so that the second bearing 24 can be mounted in the second bearing seat 42 with a good clearance fit.

In one embodiment, the second bearing 24 is bonded and fixed in the second bearing seat 42 to ensure that the outer ring of the second bearing 24 is fixed to the second bearing seat 42.

In one embodiment, the second bearing 24 can be fixed on the rotating shaft 21 by bonding or interference fit, so as to ensure a satisfactory connection between the second bearing 24 and the rotating shaft 21.

In one embodiment, referring to FIGS. 2, 5 and 6, the inner diameter d1 of the first bearing seat 41 is larger than the inner diameter d2 of the second bearing seat 42, and the outer diameter D1 of the first bearing 23 is larger than the outer diameter D2 of the second bearing 24, the rotor 20 can be inserted and mounted from one end of the first bearing seat 41, and the assembly is convenient. During assembling, the first bearing 23 and the second bearing 24 can be fixed on the rotating shaft 21 first, that is, the whole rotor 20 can be assembled first, and then the dynamic balance calibration of the rotor 20 can be performed to reduce the accumulated assembly tolerance; then the rotor 20 is inserted from one end of the supporting frame 40 to mount the rotor 20 in the supporting frame 40 as a whole, so as to simplify the assembly process and reduce the accumulated tolerance of assembly. In one embodiment, the inner diameter d1 of the first bearing seat 41 can also be arranged to be less than the inner diameter d2 of the second bearing seat 42, then the outer diameter D1 of the first bearing 23 is less than the outer diameter D2 of the second bearing 24. Thus, the rotor 20 can be inserted and mounted from one end of the second bearing seat 42, which is convenient to assemble. That is, the inner diameter d1 of the first bearing seat 41 and the inner diameter d2 of the second bearing seat 42 are not equal, so that the rotor 20 can be inserted and mounted from one end of the supporting frame 40.

In one embodiment, the outer diameter D3 of the permanent magnet 22 is greater than or equal to the outer diameter D2 of the second bearing 24, and the outer diameter D3 of the permanent magnet 22 is less than the outer diameter D1 of the first bearing 23, which is convenient for inserting the rotor 20 from one end of the first bearing seat 41 to be mounted and the assembly is convenient. Before assembling the rotor 20, the rotor 20 can be assembled as a whole and then mounted on the supporting frame 40 to better adjust the dynamic balance of the rotor 20, and the structure can make the end of the supporting frame 40 close to the first bearing seat 41 larger, which ensures the strength of the supporting frame 40 and can reduce the size of the motor.

In one embodiment, referring to FIG. 2 and FIG. 6, a gimbal ring 25 is further mounted on the rotating shaft 21 for dynamic balance calibration, so as to better adjust the balance of the rotor 20 and ensure that the rotor 20 rotates at high speed in a balanced manner.

In one embodiment, the outer diameter of the gimbal ring 25 is less than or equal to the outer diameter D1 of the first bearing 23, so that the rotor 20 can be inserted and mounted from one end of the first bearing seat 41.

In one embodiment, referring to FIG. 2 and FIG. 6, two ends of the permanent magnet 22 are respectively mounted with the gimbal rings 25 to better calibrate the dynamic balance, so that the rotating shaft 21 rotates smoothly and at high speed.

In one embodiment, the outer diameter D4 of the gimbal ring 25a close to the first bearing 23 is greater than or equal to the outer diameter D3 of the permanent magnet 22, and the outer diameter D5 of the gimbal ring 25b away from the first bearing 23 is less than or equal to the outer diameter D3 of the permanent magnet 22, which is convenient for inserting the rotor 20 from one end of the first bearing seat 41. In some embodiments, the outer diameters of the two gimbal rings 25 can be arranged to be equal, that is, D4=D5.

In one embodiment, referring to FIG. 2 and FIG. 6, an induction magnetic ring 26 is mounted on the rotating shaft 21 to induct the speed and angle of the rotating shaft 21. In one embodiment, referring to FIG. 2 and FIG. 6, the rotating shaft 21 has an induction end 212 and an output end 211, the output end 211 is used to connect the load, and the output end 211 and the induction end 212 are two ends of the rotating shaft 21, respectively. The induction magnetic ring 26 is disposed on the induction end 212 of the rotating shaft 21, and this structure can facilitate the layout of the position of the induction magnetic ring 26.

In one embodiment, referring to FIGS. 5 and 6, the outer diameter D6 of the induction magnetic ring 26 is less than or equal to the outer diameter D2 of the second bearing 24, so that the rotor 20 can be inserted and mounted from one end of the first bearing seat 41.

In one embodiment, referring to FIG. 3 and FIG. 4, at least one positioning protrusion 311 is provided on the inner side surface of the stator yoke 31. The positioning protrusions 311 are used for positioning with the support rods 43, so that to position the stator yoke 31 when the stator 30 is mounted, the assembly accuracy of the stator 30 can be ensured, and the circumferential movement of the stator yoke 31 can be avoided.

In one embodiment, referring to FIG. 3 and FIG. 4, the positioning protrusions 311 are respectively provided on the inner side surface of the stator yoke 31 at positions corresponding to the support rods 43, which can position multiple positions on the stator yoke 31 to improve the positioning of the stator 30 to ensure the assembly accuracy of the stator 30. In some embodiments, only one positioning protrusion 311 is provided on the stator yoke 31. When assembling the stator 30, the positioning protrusion 311 is positioned with a support rod 43 first, and subsequently the stator 30 is mounted. In still other embodiments, a plurality of positioning protrusions 311 may also be provided on the stator yoke 31.

In one embodiment, referring to FIG. 3 and FIG. 4, two sides of the stator yoke 31 corresponding to each support rod 43 are respectively provided with positioning protrusions 311, and a positioning groove 312 is formed between two adjacent positioning protrusions 311. When mounting the stator 30, the support rods 43 can be inserted into the corresponding positioning grooves 312 to better position the stator yoke 31. The stator yoke 31 is provided with positioning protrusions 311 on two sides of each support rod 43, which can better position and fix the stator yoke 31 on the supporting frame 40, so as to better position the support rods 43 and the stator yoke 31, and improve the assembly accuracy of the stator yoke 31. In some embodiments, only a pair of positioning protrusions 311 is provided on the stator yoke 31, and a positioning groove 312 is formed between the pair of positioning protrusions 311. When mounting the stator 30, the end of one support rod 43 can be inserted firstly to position the stator 30. In still other embodiments, multiple pairs of positioning protrusions 311 may also be provided on the stator yoke 31.

In one embodiment, the support rods 43 can be inserted into the positioning grooves 312 by interference fit or clearance fit, so as to better position the stator 30 and avoid radial and circumferential movement. In one embodiment, glue may also be provided to bond and fix the side surface of each support rod 43 in the positioning groove 312 to better fix the stator 30.

In one embodiment, referring to FIG. 3 and FIG. 4, the stator yoke 31 has a ring-shaped or frame-like structure to ensure that the magnetic circuit in the stator yoke 31 is unobstructed. In one embodiment, the stator yoke 31 can be sleeved on the supporting frame 40 by interference fit, so as to implement the fixed connection between the stator 30 and the supporting frame 40.

In one embodiment, the stator teeth 32 and the stator yoke 31 are integrally formed to facilitate processing and manufacture, ensure the strength of the manufactured stator yoke 31, and ensure unobstructed magnetic circuit between the stator yoke 31 and the stator teeth 32.

In one embodiment, referring to FIG. 3 and FIG. 5, the stator yoke 31 is bonded and fixed on the support rod 43 so as to fix the stator 30 on the supporting frame 40.

Figure 8:
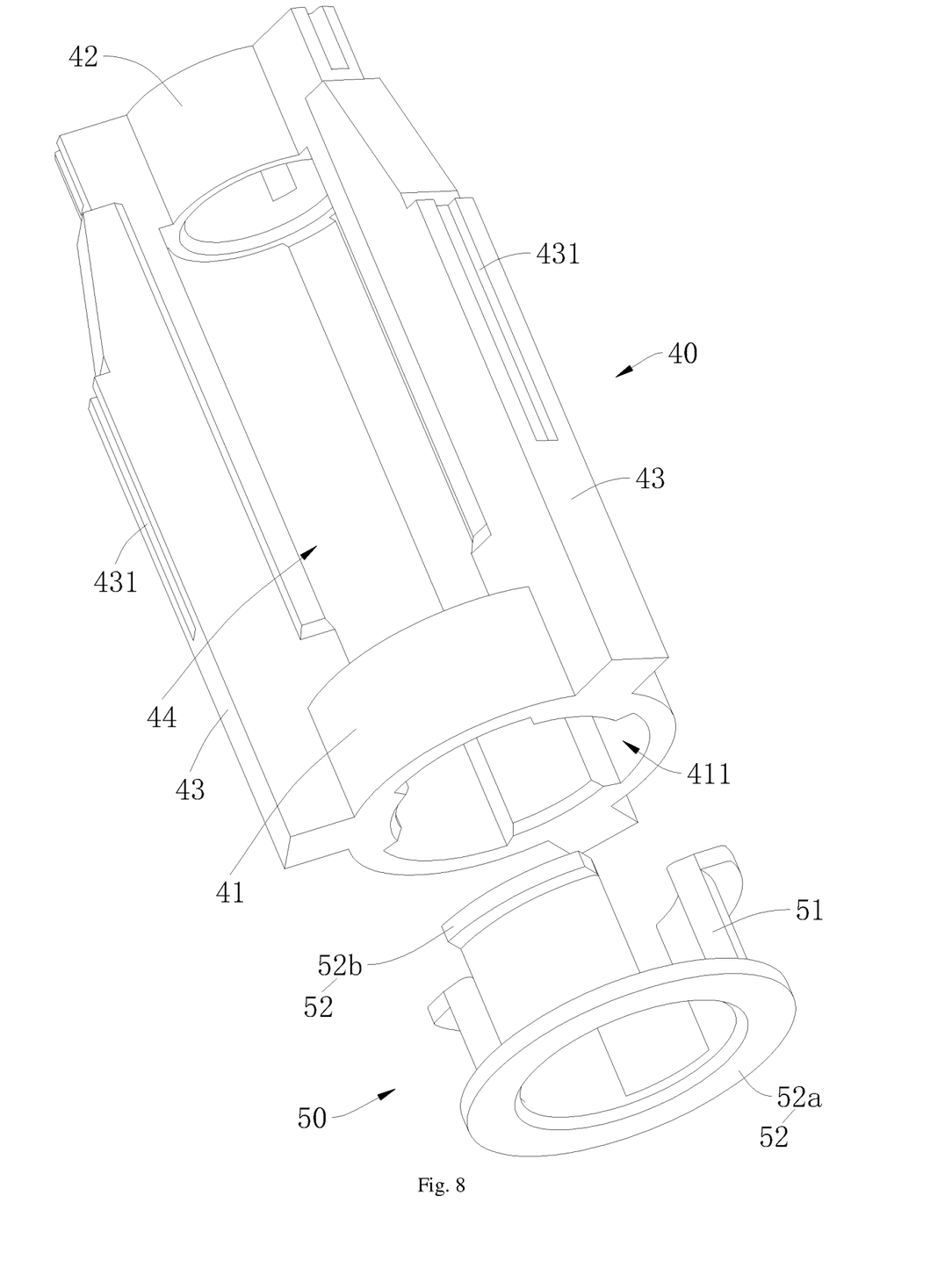
FIG. 8 is a schematic structural view of the disassembly of a supporting frame and a soft washer provided by the embodiment of the present application.

In one embodiment, referring to FIG. 3, FIG. 7 and FIG. 8, each support rod 43 of the supporting frame 40 is provided with a slot 431, and the slot 431 is located on the side of the support rod 43 close to the stator yoke 31. The slot 431 is located on the outer side surface of the support rod 43 along the radial direction of the rotating shaft 21, and the slot 431 extends along the length direction of the support rod 43. With the arrangement of the slot 431, the glue can be filled in the slot 431 when the stator yoke 31 is bonded to the support rod 43, so as to ensure good bonding and fixing of the stator yoke 31 and the support rods 43. The slot 431 can also accommodate excess glue, prevent the glue from overflowing or seeping out of the end of the stator 30, and avoid affecting other components, thereby avoiding affecting the reliability of the rotating motor 10 and deteriorating the airflow noise of the rotating motor 10. In addition, when the rotating motor 10 is used in the fan 100, the glue overflowing between the stator yoke 31 and the support rod 43 will also affect the air flow path, thereby hindering the flow of air and generating turbulence, thereby affecting the performance and efficiency of the fan 100 and deteriorating noise. The arranging of the slot 431 on the support rod 43 to accommodate excess glue can effectively avoid hindering the flow of the air and reduce the generation of turbulence, ensure the performance of the fan 100, and improve the efficiency of the fan 100 and reduce the noise of operation.

In one embodiment, referring to FIG. 3 and FIG. 7, the slot 431 can be provided on each support rod 43, that is, each support rod 43 and the stator yoke 31 can be bonded and fixed better by using glue, so as to ensure the strength of the connection between the stator 30 and the supporting frame 40, and can also prevent the glue at each support rod 43 from overflowing or seeping out of the end of the stator 30, so as to avoid affecting other components, thereby avoiding affecting the reliability of the rotating motor 10 and deteriorating airflow noise of the rotating motor 10. In some embodiments, one support rod 43 is provided with a slot 431 or several support rods 43 are provided with a slot 431, respectively.

In one embodiment, referring to FIG. 5, the length L2 of the slot 431 on the support rod 43 refers to the length of the slot 431 along the axial direction of the rotating shaft 21. The axial length L1 of the stator yoke 31 refers to the length of the sub yoke 31 along the axial direction of the rotating shaft 21, and the length L2 of the slot 431 on the support rod 43 is less than the axial length L1 of the stator yoke 31, that is, L2<L1, which can prevent the glue from overflowing from the end of the stator 30, the performance and reliability of the rotating motor 10 can be ensured in preparation, and noise deterioration can be avoided.

In one embodiment, referring to FIG. 7, the supporting frame 40 can be integrally formed by injection molding or die-casting process, so as to ensure good strength of the supporting frame 40 and can effectively ensure the coaxiality between the first bearing seat 41 and the second bearing seat 42, which simplifies assembly times, and reduces assembly accumulated tolerances. In addition, the coaxiality between the supporting frame 40 and the rotor 20 can be improved to ensure the flexible and stable rotation of the rotor 20 in the supporting frame 40, and the assembly accuracy of the stator 30 can be improved, which is beneficial to ensure the electromagnetic air gap between the stator 30 and the rotor 20.

Figure 9:
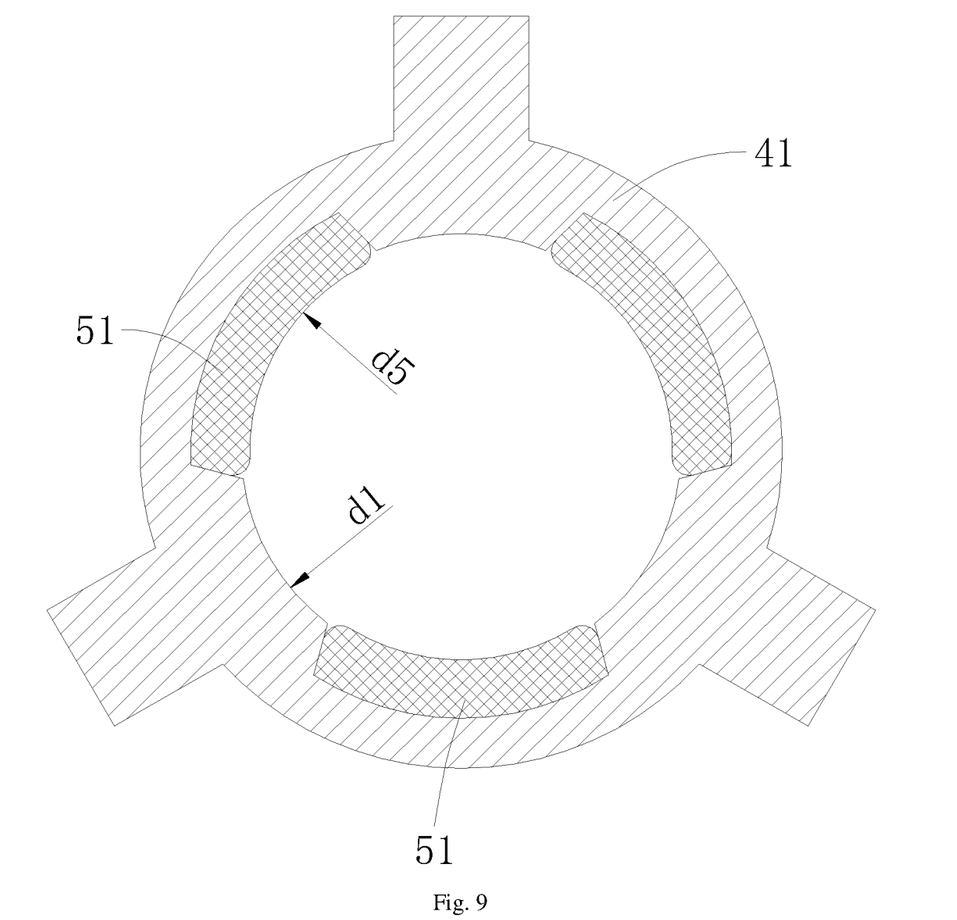
FIG. 9 is a schematic cross-sectional structural view of a first bearing seat when the supporting frame and the soft washer are assembled in FIG. 8.

In one embodiment, referring to FIG. 5, FIG. 8 and FIG. 9, a soft washer 50 is mounted in the first bearing seat 41, and the first bearing 23 is supported in the soft washer 50. With the arranging of the soft washer 50 in the first bearing seat 41, the soft washer 50 supports the first bearing 23 and can absorb the load of the rotating motor 10 (such as the radial force in any direction generated by the impeller 61, grinding wheel, blade, etc.), in order to improve the force of the first bearing 23, to increase the service life of the first bearing 23, to reduce vibration, and to ensure the smooth and good rotation of the rotating shaft 21. In addition, the first bearing 23 is supported by the soft washer 50, so that there is a certain binding force between the soft washer 50 and the first bearing 23, and the rotating motor 10 can bear a certain axial force and effectively absorb the load generated by the axial force along the axial direction of the rotating shaft. 21. Through the good elastic effect of the soft washer 50, the rotor 20 can also adjust the relative position of the inner ring and the outer ring of the first bearing 23 when the rotor 20 rotates at a high speed, and can have a certain self-adaptive centering effect to ensure the operation stability and reliability of the rotating motor 10.

In one embodiment, the soft washer 50 can be formed in a ring shape and the soft washer 50 can be arranged between the first bearing 23 and the first bearing seat 41, so that the soft washer 50 and the first bearing 23 can be better diffused and combined and so that there is a certain binding force between the soft washer 50 and the first bearing 23. The soft washer 50 can also provide elastic force along the radial direction, so as to improve the axial and radial force of the first bearing 23 and improve the service life of the first bearing 23 to ensure the operation stability and reliability of the rotating motor 10.

Figure 10:
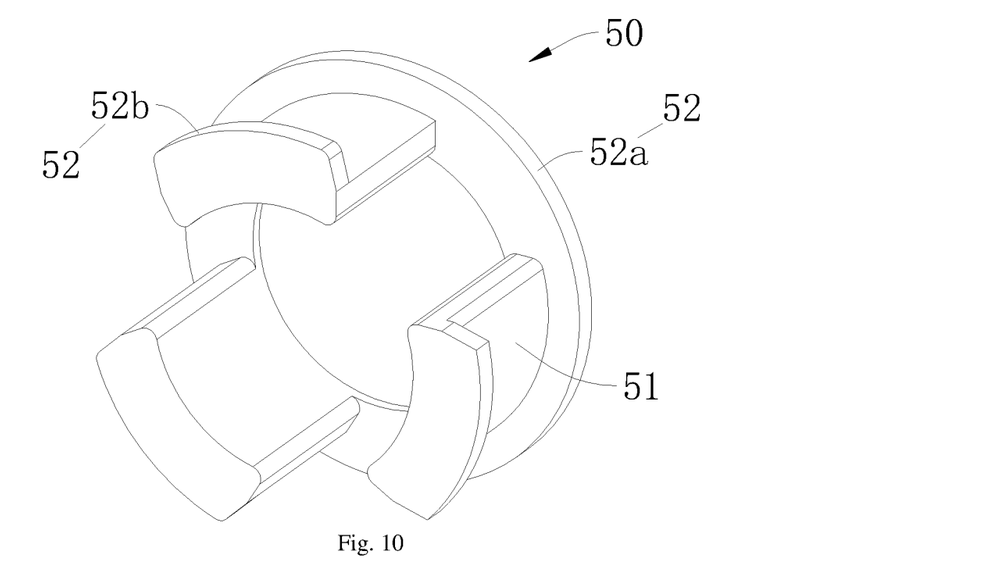
FIG. 10 is a schematic structural view of a first type of a soft washer provided by the embodiment of the present application.

In one embodiment, referring to FIG. 8, FIG. 9 and FIG. 10, the inner surface of the radial direction of the first bearing seat 41 is provided with a plurality of accommodating grooves 411, and two adjacent accommodating grooves 411 are arranged at intervals. The soft washer 50 includes a plurality of soft arc-shaped petals 51, and the plurality of soft arc-shaped petals 51 are respectively placed in the plurality of accommodating grooves 411. Thus, each accommodating groove 411 is mounted with a soft arc-shaped petal 51, and the inner diameter d5 of each soft arc-shaped petal 51 is less than the inner diameter d1 of the first bearing seat 41, so that the soft arc-shaped petals 51 elastically resist the first bearing 23, such that a certain binding force is provided between the soft arc-shaped petals 51 and the first bearing 23 to improve the axial and radial force of the first bearing 23, increase the service life of the first bearing 23, and ensure the operation stability and reliability of the rotating motor 10. The structure can also make the first bearing 23 well connected in the area between the two adjacent accommodating grooves 411 in the first bearing seat 41, so that the first bearing 23 can be more stably mounted in the first bearing seat 41.

In one embodiment, the plurality of accommodating grooves 411 are uniformly provided in the first bearing seat 41 so that the circumferential force of the first bearing 23 can be uniformly applied.

In one embodiment, referring to FIG. 8 and FIG. 9, each accommodating groove 411 penetrates the first bearing seat 41 in the axial direction, so as to facilitate the mounting and fixing of the soft arc-shaped petals 51, and also facilitate the manufacturing of the first bearing seat 41 to ensure the accuracy of processing. In addition, each soft arc-shaped petal 51 can better partially wrap the first bearing 23, so that each soft arc-shaped petal 51 can be better combined with the first bearing 23. In some embodiments, each accommodating groove 411 can also be located at the middle position of the inner surface of the radial direction of the first bearing seat 41, so as to better position each soft arc-shaped petal 51.

In one embodiment, referring to FIG. 8 and FIG. 10, both sides of each soft arc-shaped petal 51 are respectively provided ribs 52, and each rib 52 protrudes outwardly along the radial direction of the soft arc-shaped petal 51. When mounting the soft arc-shaped petals 51, the ribs 52 on both sides of the soft arc-shaped petals 51 can be respectively attached to the two axial ends of the first bearing seat 41, so as to prevent the soft arc-shaped petals 51 from sliding or falling off in the axial direction of the first bearing seat 41.

In one embodiment, the rib 52 can also be provided only on one side of each soft arc-shaped petal 51 to position one side of each soft arc-shaped petal 51. Referring to FIG. 5, for example, in some applications, the acting force of the load on the rotating motor 10 will be directed from the first bearing seat 41 to the permanent magnet 22, so the rib 52 can be provided only on the side of the soft arc-shaped petals 51 away from the second bearing seat 42 to prevent soft arc-shaped petals 51 slide or fall off in the axial direction of the first bearing seat 41. However, in some applications, the force of the load on the rotating motor 10 will be the direction of the first bearing seat 41 away from the permanent magnet 22, and the rib 52 can be provided only on the side of the soft arc-shaped petal 51 close to the second bearing seat 42 to prevent the soft arc-shaped petal 51 from slipping or falling off in the axial direction of the first bearing seat 41.

In one embodiment, referring to FIG. 10, the plurality of ribs 52 on one side of the soft arc-shaped petal 51 are connected in a ring shape, so as to facilitate the mounting of the soft arc-shaped petals 51 in each accommodating groove 411 in the first bearing seat 41.

Figure 11:
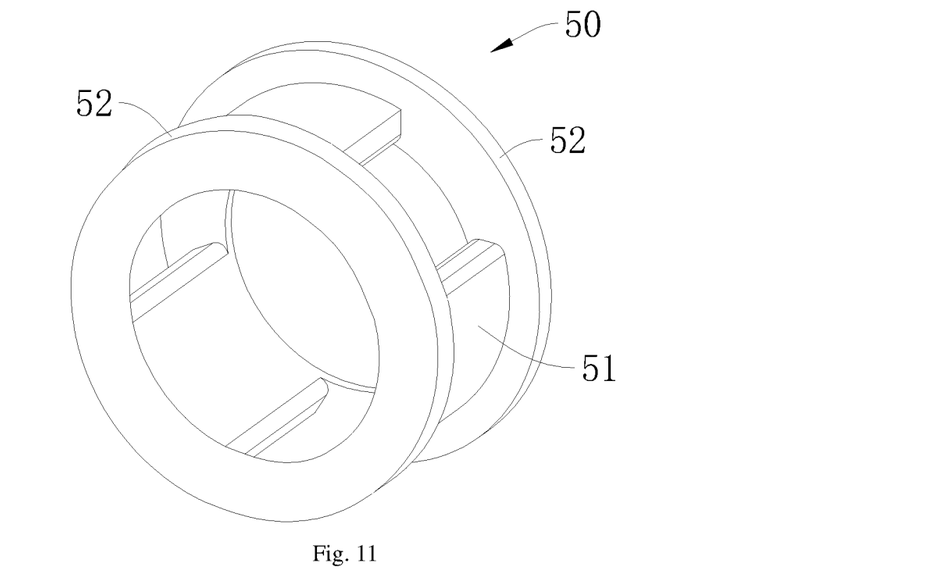
FIG. 11 is a schematic structural view of a second type of a soft washer provided in an embodiment of the present application.

In one embodiment, referring to FIG. 10, when each soft arc-shaped petal 51 is provided with ribs 52 on both sides, the plurality of ribs 52 on one side of the soft arc-shaped petals 51 can be connected in a ring shape, that is, the ribs 52a on one side of the soft washer 50 is annular as a whole, and the ribs 52b on the other side of the soft washer 50 is a multi-petal structure at intervals, so that it cannot only connect and support each soft arc-shaped petal 51, but also convenient for each soft arc-shaped petal 51 to be placed in the accommodating groove 411 in the first bearing seat 41. In one embodiment, referring to FIG. 11, when each soft arc-shaped petal 51 is provided with ribs 52 on both sides, the plurality of ribs 52 on both sides of the soft arc-shaped petals 51 can also be connected to form an annular shape, that is, the plurality of ribs 52 on each side of the soft arc-shaped petals 51 are respectively connected in an annular shape, so as to better connect and support the soft arc-shaped petals 51. In still other embodiments, when each soft arc-shaped petal 51 is provided with a rib 52 only on one side, the plurality of ribs 52 on the side of the soft arc-shaped petals 51 can be connected in a ring shape.

In one embodiment, the soft washer 50 can be made of a material with lower hardness, such as a rubber material or a thermoplastic elastomer material, so as to ensure good elasticity of the soft washer 50.

In one embodiment, referring to FIG. 2 and FIG. 5, the rotating shaft 21 is provided with an output end 211, and the output end 211 is used to connect the load, so the first bearing 23 and the first bearing seat 41 are located at the output end 211 of the rotating shaft 21, that is the first bearing 23 and the first bearing seat 41 are located at the end of the rotating shaft 21 close to the load. In the embodiment, the first bearing 23 and the first bearing seat 41 are located at one end of the rotating shaft 21 close to the impeller 61. When the rotating shaft 21 rotates, the soft washer 50 in the first bearing seat 41 can more effectively absorb the axial and radial forces along the rotating shaft 21, so as to ensure the operation stability and reliability of the rotating motor 10.

In the rotating motor 10 of the embodiments of the present application, the rotating shaft 21, the permanent magnet 22, the first bearing 23 and the second bearing 24 can be assembled into the rotor 20 as a whole, and then the dynamic balance calibration of the rotor 20 can be performed to ensure the overall flexibility of the rotor 20, so that the overall accumulated assembly tolerance of the rotor 20 is smaller. The entire rotor 20 can be inserted from one end of the supporting frame 40 and mounted in the supporting frame 40, and the assembly structure formed by the rotor 20 and the supporting frame 40 can be calibrated to ensure the smooth rotation of the rotating shaft 21 and reduce the accumulated assembly tolerance. The stator 30 is then sleeved on the supporting frame 40 from the end of the supporting frame 40 close to the second bearing seat 42, so that the inner side surface of the stator yoke 31 is fixed on the supporting frame 40. Therefore, the rotating motor 10 can be divided into three parts: the rotor 20, the stator 30 and the supporting frame 40, and the three parts can be assembled to reduce the direct assembly process of the parts and the whole, reduce the accumulated assembly tolerance, and effectively improve the coaxiality between the rotor 20, and the first bearing seat 41 and the second bearing seat 42 and the inner circular holes of the stator teeth 32 on the supporting frame 40, and effectively ensure the electromagnetic air gap between the stator 30 and the rotor 20, and ensure the operation reliability and stability of the rotating motor 10.

The rotating motor 10 of the embodiments of the present application can achieve balanced high-speed operation and ensure a good service life. The rotating motor 10 of the embodiments of the present application can be applied to household appliances, such as a fan 100, and can also be applied to equipment, such as an electric grinding wheel. The fan 100 of the embodiment of the present application can keep the impeller 61 rotating at a high speed, and can be used in blowers, vacuum cleaners, compressors and other devices.

The above are only optional embodiments of the present application, and are not intended to limit the present application. Various modifications and variations of the present application are possible for those skilled in the art. Any modification, equivalent replacement, improvement, etc. made within the spirit and principle of the present application shall be included within the scope of the claims of the present application.

What is claimed is:

1. A rotating motor comprising:
    a stator,
    a rotor, and
    a supporting frame;
    wherein:
    the rotor comprises a rotating shaft, a permanent magnet mounted on the rotating shaft, and a first bearing and a second bearing respectively mounted on two ends of the rotating shaft;
    the stator comprises a stator yoke sleeved on the supporting frame, a plurality of stator teeth arranged on the stator yoke, and coils respectively wound on the stator teeth;
    the supporting frame comprises a first bearing seat, a second bearing seat, and a plurality of support rods supporting the stator yoke;
    two ends of each support rod are respectively connected to the first bearing seat and the second bearing seat, and an interval space is provided between two adjacent support rods and configured to place the stator teeth; and
    the first bearing is mounted in the first bearing seat, the second bearing is mounted in the second bearing seat, and an inner diameter of an inner circular hole of the stator teeth is larger than an outer diameter of the second bearing seat.

2. The rotating motor according to claim 1, wherein:
an inner diameter of the first bearing seat is larger than an inner diameter of the second bearing seat; or
the inner diameter of the first bearing seat is less than the inner diameter of the second bearing seat.

3. The rotating motor according to claim 2, wherein when the inner diameter of the first bearing seat is larger than the inner diameter of the second bearing seat, an outer diameter of the permanent magnet is greater than or equal to the outer diameter of the second bearing, and the outer diameter of the permanent magnet is less than the outer diameter of the first bearing.

4. The rotating motor according to claim 1, wherein an inner side surface of the stator yoke is provided with at least one positioning protrusion configured to position with the support rods.

5. The rotating motor according to claim 4, wherein:
the at least one positioning protrusion comprises a plurality of positioning protrusions on both sides of the stator yoke corresponding to the support rods, and
a positioning groove is formed between two adjacent positioning protrusions and configured for the support rods to be inserted therein.

6. The rotating motor according to claim 5, wherein the support rods are inserted into the positioning grooves by interference fit or clearance fit.

7. The rotating motor according to claim 1, wherein the stator yoke is bonded and fixed on the support rods.

8. The rotating motor according to claim 7, wherein:
at least one of the support rods is provided with a slot,
the slot extends along a length direction of the support rod, and
the slot is located on a surface of the support rod close to the stator yoke.

9. The rotating motor according to claim 8, wherein a length of the slot in an axial direction of the rotating shaft is less than a length of an axial direction of the stator yoke.

10. The rotating motor according to claim 8, wherein each support rod is provided with the slot.

11. The rotating motor according to claim 1, wherein a soft washer is mounted in the first bearing seat and the first bearing is supported in the soft washer.

12. The rotating motor according to claim 11, wherein:
an inner surface of a radial direction of the first bearing seat is provided with a plurality of accommodating grooves spaced apart,
the soft washer comprises a plurality of soft arc-shaped petals respectively arranged in the accommodating grooves, and
an inner diameter of each of the soft arc-shaped petals is less than an inner diameter of the first bearing seat.

13. The rotating motor according to claim 12, wherein:
each of the accommodating grooves penetrates through the first bearing seat in an axial direction, and
at least one side of each of the soft arc-shaped petals is outwardly protruded with a rib along the radial direction of the soft arc-shaped petal.

14. The rotating motor according to claim 13, wherein a plurality of the ribs on at least one side of the soft arc-shaped petals are connected in a ring shape.

15. The rotating motor according to claim 11, wherein the soft washer is arranged in a ring shape, and the soft washer is arranged between the first bearing and the first bearing seat.

16. The rotating motor according to claim 1, wherein the supporting frame is integrally formed by injection molding or die-casting.

17. The rotating motor according to claim 1, wherein the stator yoke is in a ring or frame-like structure, and the stator yoke is sleeved on the supporting frame by interference fit.

18. The rotating motor according to claim 1, further comprising a gimbal ring mounted on the rotating shaft.

19. The rotating motor according to claim 1, further comprising an induction magnetic ring mounted on the rotating shaft.

20. A fan comprising:
a rotating motor; and
an impeller, wherein in the impeller is mounted on a rotating shaft,
wherein the rotating motor comprises:
a stator,
a rotor, and
a supporting frame;
wherein:
the rotor comprises a rotating shaft, a permanent magnet mounted on the rotating shaft, and a first bearing and a second bearing respectively mounted on two ends of the rotating shaft;
the stator comprises a stator yoke sleeved on the supporting frame, a plurality of stator teeth arranged on the stator yoke, and coils respectively wound on the stator teeth;
the supporting frame comprises a first bearing seat, a second bearing seat, and a plurality of support rods supporting the stator yoke, two ends of each support rod are respectively connected to the first bearing seat and the second bearing seat, and an interval space is provided between two adjacent support rods and configured to place the stator teeth; and
the first bearing is mounted in the first bearing seat, the second bearing is mounted in the second bearing seat, and an inner diameter of an inner circular hole of the stator teeth is larger than an outer diameter of the second bearing seat.

* * * * *